No. 887,413. PATENTED MAY 12, 1908.
L. J. MONAHAN.
SPEED AND POWER CONTROLLING MECHANISM.
APPLICATION FILED JUNE 12, 1905.

2 SHEETS—SHEET 1.

WITNESSES:
J. Farrell
Mary Monahan

INVENTOR
Louis J. Monahan
BY

ATTORNEY

No. 887,413. PATENTED MAY 12, 1908.
L. J. MONAHAN.
SPEED AND POWER CONTROLLING MECHANISM.
APPLICATION FILED JUNE 12, 1905.
2 SHEETS—SHEET 2.
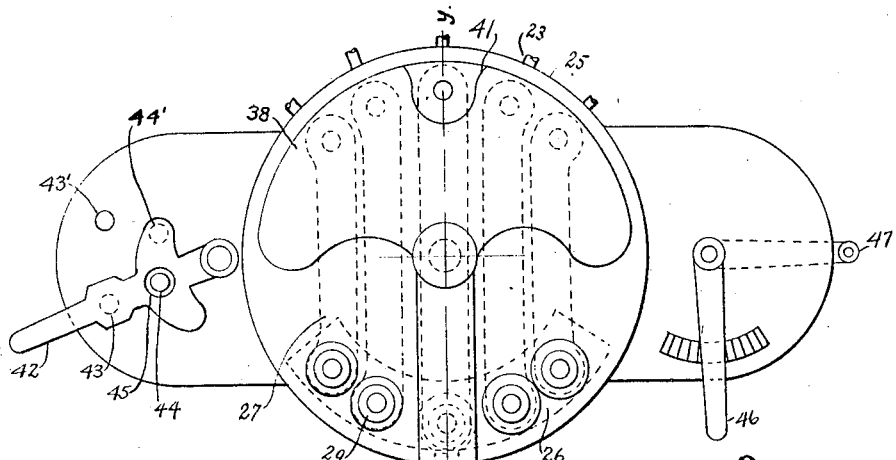
Fig.3.
Fig.6.
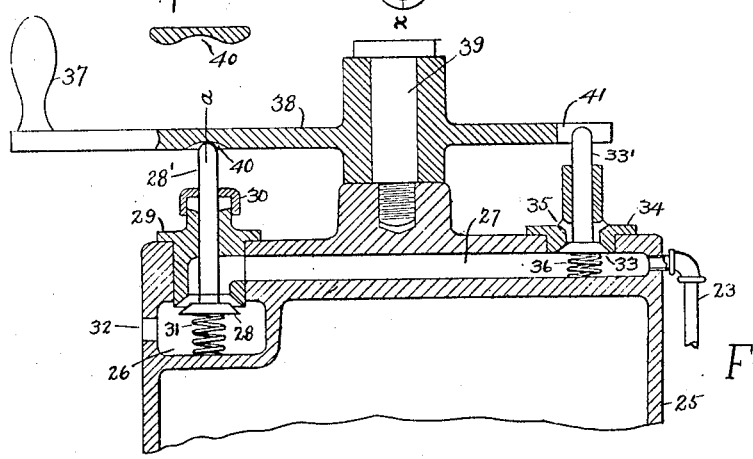
Fig.4.
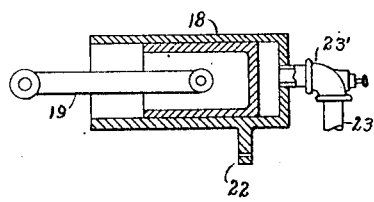
Fig.5.
WITNESSES:
J. Farrell
Mary Monahan
INVENTOR
Louis J Monahan
BY
ATTORNEY

UNITED STATES PATENT OFFICE.

LOUIS J. MONAHAN, OF OSHKOSH, WISCONSIN, ASSIGNOR OF ONE-THIRD TO J. D. TERMAAT AND ONE-THIRD TO M. L. COTTRILL, OF OSHKOSH, WISCONSIN.

SPEED AND POWER CONTROLLING MECHANISM.

No. 887,413.  Specification of Letters Patent.  Patented May 12, 1908.

Application filed June 12, 1905. Serial No. 264,972.

*To all whom it may concern:*

Be it known that I, LOUIS J. MONAHAN, a citizen of the United States, residing in the city of Oshkosh, in the county of Winnebago and the State of Wisconsin, have invented certain new and useful Improvements in Speed and Power Controlling Mechanism, of which the following is a specification.

My invention has relation to improvements in speed and power controlling mechanism, more especially with relation to its application to car driving, by means of internal combustion engines, whereby the speed and power can be controlled by simple and easily operated levers, or their equivalents.

A primary object of the invention is to provide means for controlling, partially or wholly, the power and speed delivered to the drive wheels of a car, or other vehicle, independently of the power and speed of the engine or motor.

A further object is to provide an improved construction that will increase the power or turning effect of the drive wheels at a sacrifice of speed, but with a practically constant speed and power delivered by the engine or motor.

A further object is to provide for changing the speed by novel arrangement of lower or higher gearing, brought into play by means of friction clutches operated by compressed air, or other fluid.

A further object is to provide means for controlling the speed and power to the drive wheels, without any effort on the part of the operator, other than the slight movement of a light lever, the arrangement also being such that the chance for confusion on the part of the operator in operating the mechanism is reduced to the minimum.

Figure 1:
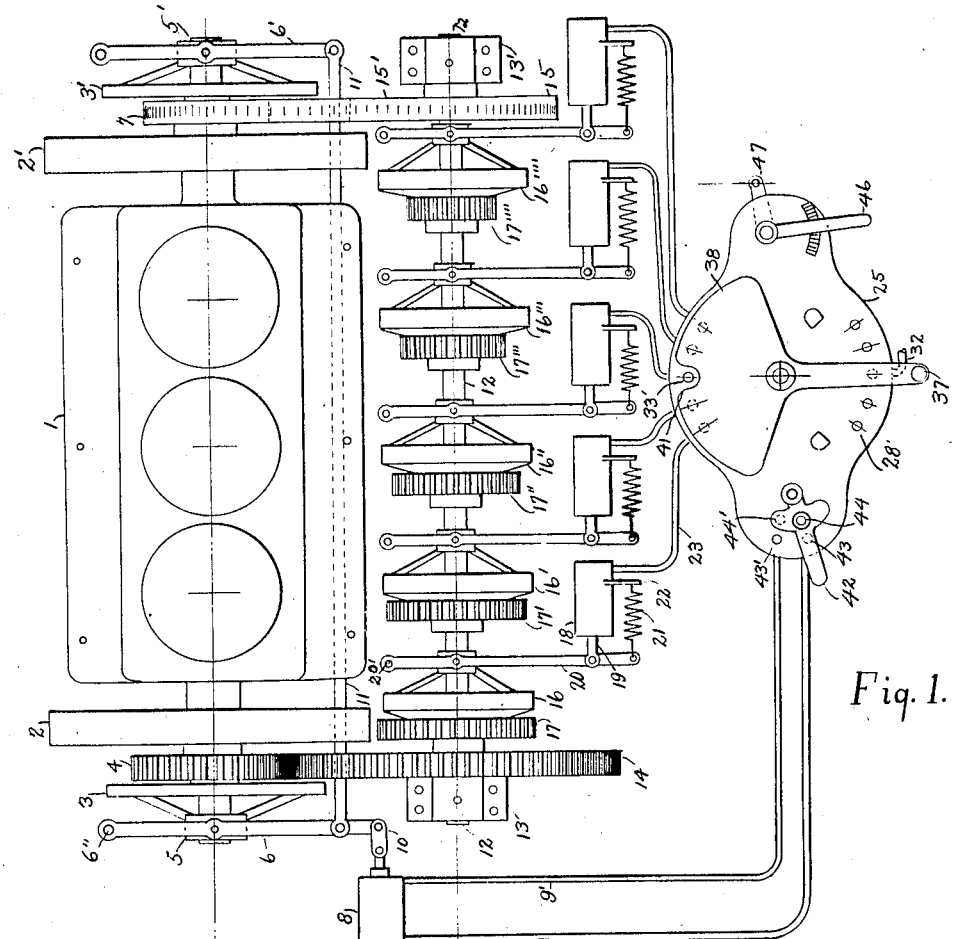
Figure 2:
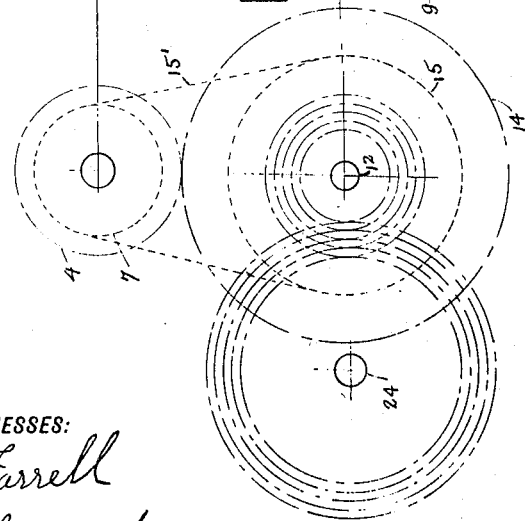

In the accompanying drawing, Figure 1 represents a top or plan view of the improved arrangement, showing plainly the method of controlling the clutches; Fig. 2 shows a desirable arrangement of gears and chains for transmitting power from one shaft to another, and also the relation of one shaft to the other, the view being a skeleton end view of Fig. 1; Fig. 3 is a plan view of the controlling box, showing the arrangement of air valves, by connections and levers; Fig. 4 is a vertical sectional view of Fig. 3, taken on a plane centrally through said figure; Fig. 5 is a sectional view of one of the air cylinders; and Fig. 6 is a section at *a*, Fig. 4 of the operating lever, showing an indentation on the underside of said lever.

Referring to the drawings, the numeral 1 indicates a three-cylinder gas engine of an ordinary type, and which may be mounted upon any suitable supporting framework. The numerals 2—2' indicate fly wheels mounted upon an engine shaft, and 3 indicates a heavy friction clutch mounted upon the same shaft outside of the fly wheel 2. This fly wheel has a gear 4 adjacent thereto, and which is normally loose on the shaft, but is made rigid to the shaft when the clutch is engaged therewith. The clutch is operated by means of a sliding collar 5, which collar, in turn, is caused to be moved longitudinally on the shaft by means of a lever 6, fulcrumed at 6'', the said lever being forked over the collar. Another clutch 3' of similar construction is mounted upon the opposite end of the engine shaft, and is provided with a similar sliding collar 5', operated by means of a lever 6'. A sprocket wheel 7 is mounted on this end of the engine shaft in a similar manner to the gear 4, and is clutched to or unclutched from the shaft by means of its associated friction clutch.

A double acting air cylinder 8 is arranged near the end of the lever 6, and has a piston therein with a piston rod extending out through one end thereof. A pipe 9 supplies air to one end of this cylinder, and another pipe 9' to the opposite end thereof. The piston rod is connected to the lever 6 by means of a link 10. It is obvious that with the movement of the piston in the cylinder, the lever 6 will also be moved correspondingly. The two levers 6 and 6' are connected by means of a long link or bar 11. By means of this connection, when one clutch is operated to effect the clutching engagement, the other clutch is operated in a manner to disengage or unclutch.

A countershaft 12 is mounted in suitable bearings or journals 13—13', and it may also, if desired, have one or more bearings throughout its length, as the length may demand.

Mounted rigidly on the end of the shaft 12 is a gear 14 adapted to mesh into the gear 4 of the engine shaft. Upon the opposite end of the counter shaft 12 is mounted rigidly a sprocket wheel 15, and a sprocket chain 15', preferably of the noiseless construction or arrangement, connects the sprocket wheel 15 to the sprocket wheel 7, whereby the rotation of the wheel 7 will impart rotation to the wheel 15 and to the shaft 12.

A plurality of friction clutches, designated 16, 16′, 16″, 16‴, and 16⁗, are mounted upon the shaft 12. Mounted loosely on the said shaft 12 are gears 17, 17′, 17″, 17‴ and 17⁗, which operate in connection with the respective clutches in such manner that when any one of the clutches is operated in one direction the gear relating thereto is locked to the shaft, and when operated in the opposite direction, the gear relating thereto is unlocked from the shaft. It will be seen that the diameters of the gears increase progressively from one end of the shaft to the other, that is to say, the smallest gear is at the right hand end of the shaft, and the diameters of the remaining gears increase progressively toward the left. This is for the purpose of affording different speed ratios.

For causing the engagement of the different clutches, air cylinders 18 (shown in detail in Fig. 5) are provided. These cylinders are all similar in construction, and are single acting. A piston rod 19 extends from the piston of each cylinder and projects outwardly through one end of each cylinder to connect with the clutch lever 20 of each of the clutch mechanisms mounted on the counter shaft 12. Each of these levers is fulcrumed at 20′, and has connected to its outer end a coiled spring 21, the other end of each coiled spring being connected to a lug 22 extending from each cylinder. Each spring serves to hold the piston of each cylinder back to the limit of its inward stroke.

A pipe 23 is connected to each cylinder 18 for supplying and exhausting air therefrom, and each of these pipes may be supplied with an adjustable check valve 23′, so that the amount of air entering a cylinder can be adjusted, and the exhaust can quickly escape. It is obvious that when a piston of any of these cylinders moves outwardly, the lever 20 connected to the piston rod will be turned on its fulcrum in a direction to cause the clutch operated thereby and mounted upon the shaft 12 to be moved into clutching position.

A second countershaft 24 (Fig. 2), and parallel with shaft 12, is mounted in suitable bearings. This countershaft 24 has a series of gears secured thereto of suitable size to mesh with the gears 17, 17′, 17″, 17‴, and 17⁗. The dotted lines in Fig. 2 represent the pitch lines of the several gears, of shaft 24, and clearly show that by the engagement of any clutch on shaft 12 with the gear relating thereto, a given speed is imparted to the shaft 24, and that, therefore, different speeds may be given to said shaft 24 by effecting the engagement of different clutches on shaft 12 with the respective gears relating thereto. From the shaft 24 the power is transmitted to the axles or drive wheels of a car or other object to be driven.

The mechanism for controlling the clutches on the shaft 12 through the medium of the air cylinders is shown in detail in Figs. 3 and 4. Referring to this mechanism, the numeral 25 indicates a box of convenient form, which has cast integral therewith an air passage 26, preferably in the form of a segmentally-shaped chamber, as most clearly shown in Fig. 3. A series of passages or ports 27 are formed in the box directly above the segmental chamber, and these passages extend across the box and are equal in number to the number of clutches mounted on the shaft 12. Each of the passages 27 is in communication with the chamber 26 by means of an opening, and fitted in each of these openings, and adapted to control each opening, is a valve 28, preferably of the puppet type. Each of these valves has a stem 28′ projecting therefrom, and having its upper end preferably rounded. Fitted in each of the openings between the chamber 26 and the passages 27 is a cage 29, the lower end thereof forming a seat for the valve 28 relating thereto. Each cage has an opening vertically therethrough through which the valve stem passes. Each cage is fitted in its opening so as to make a tight joint at the tops and between the air chamber 26 and the passage 27. A stuffing box 30 is advisably fitted to the upper end of each cage for packing the valve stem against leakage. A spring 31 is inserted between the under side of each valve 28 and the bottom of the air chamber 26, for the purpose of normally holding the valve closed. An opening 32 is provided in the air chamber 26 for a pipe connection to a compressed air reservoir (not shown).

Each passage 27 is provided at the end thereof opposite to the end which communicates with the chamber 26 with an opening which is controlled by means of an exhaust valve 33. Each of these valves is provided with an upwardly extending stem 33′, preferably having an upper rounded end and passing through a cage 34 fitted to each opening. Each cage is provided with holes or outlets 35 in order to permit of the exhaust of the air in the passage 27 which it communicates with. A coiled spring 36 is interposed between the under side of each of the valves 33 and the bottom of each passage 27, and each of said springs is adapted to normally hold its particular valve to the valve seat formed at the lower end of each cage 34.

The pipes 23 hereinbefore referred to, and which extend from the air cylinders 18, lead to and communicate with each of the passages 27.

For operating the valves 28 and 33, a controller handle 37 is provided, and this handle projects from one end of a lever 38, the opposite end of said lever being preferably in the form of a segmental plate. This lever device is journaled at 39, and the lever proper is provided on its under side with a depression 40, shown clearly in Fig. 6. This depression is so positioned as to be in the path of the valve stems 28′, and as clearly shown in Fig. 4, when one of these valve stems is resting in the depression, the valve of the particular stem is held in open position, so that air can freely pass from the chamber 26 to the upper passage 27 controlled by this valve. The segmentally-shaped end of the lever 38 is adapted to rest on the upper ends of the exhaust valve stems 33′, excepting at its center, where the outer edge of the segmentally-shaped end is cut out centrally, as indicated by the numeral 41, to allow one of the valves 33 to close by its valve stem 33′ extending up into said cut away portion. It is obvious that when an admission valve is opened by means of the lever 38, its associated exhaust valve is closed. Another lever 42 is provided for controlling the double acting air cylinder 8. This lever 42 while constructed along substantially the same lines as the previously described lever 38, is yet of slightly different form. The lever 42 is adapted to operate upon inlet valve stems 43—43′, and exhaust valve stems 44—44′, extending from valves similar to valves 28 and 33. The lever 42 is so formed that when it is over a particular inlet valve 43 or 43′, the exhaust valve 44, 44′ is closed, a hole 45 being provided in the lever 42 to permit the exhaust valve stem to extend upwardly therethrough. Under such condition, the other exhaust valve, is open, and the inlet relating thereto closed.

It will be clear from the action of the double acting cylinder 8 that either clutch 3 or 3′ on the engine shaft is engaged, while the other is disengaged, and that therefore the lever 42 is only used for reversing the direction of rotation of the driven object, as, for instance, a street car, and that the efficiency of driving and control of speed is equal in either direction.

Another lever 46 is shown at the opposite side of the controller box, and the object of this lever is to provide a convenient means for controlling the speed of the engine or motor from the controller box, and independently of the mechanical devices herein shown and before described. This lever is simply a bell crank device, the arm 47 thereof having a rod, or other suitable connection, projecting therefrom, and extending to and connecting with the governor of the engine, whereby the tension of the spring which exerts a pressure against that produced by the centrifugal force acting through the governor balls, can be varied to give different engine speeds.

In car driving, it is of great importance that the pulling power be increased with low speeds for hard pulling, such as climbing hills, overcoming snowdrifts, etc. My improved driving mechanism not only reduces speed through larger ratios of gearing, but also increases the leverage or pulling power at the wheels, while the power yet remains constant at the engine. My improved controller box also presents a most simple and effective means for handling a car, it being very similar to the ordinary electric controllers, at the present time, and is operated with comparative ease.

In operation, and when, for instance, my improved mechanism is used in connection with a car, the said mechanism may be hung on a steel plate, or other suitable support, and connections made from the counter shaft 24 to the driving axles, either through bevel gears, or special gears or chains, in a manner to positively rotate the drive wheels. An air pump and storage tank are also necessary, and the former may be driven from the engine. The air is piped from the storage tank to the chamber 26 of the controller box, and also to a similar chamber under the valves 43, 43′ of the reversing lever. The reversing lever is first set so as to cause the engine to run in the direction desired, and the power is then either transmitted through the gear 4 or the chain 15′, as the case may be, to the countershaft 12, dependent upon the particular adjustment of the reversing lever, inasmuch as the air pressure acting on one side of the piston in the cylinder 8 will cause the clutch members 6—6′ to move to the extreme end of their travel, engaging one and disengaging the other clutch. While the lever 38 is off to one side (the side to the left or the slowest speed clutches) the shaft 12 will rotate idle. In order to start the car, the lever 38 is moved on to the first valve stem 28′, and the engine thereby set at rather slow speed by means of the lever 46. In this adjustment, as the lever 38 is over an inlet valve, communication is opened between one of the passages 27 and the first air cylinder 18. The air under pressure will, therefore, rush into the said cylinder at a velocity dependent upon the extent of the opening of the valve 23′ controlling the particular pipe 23, and which can be regulated so that the piston will move rather slow, and gradually cause the engagement of one of the clutches on shaft 12, without jerking. The speed, of course, can be increased by moving the lever 38 over to the next or second valve stem 28′, when of course the former inlet valve will be closed and its exhaust opened, and the action of the spring 21 will cause the disengagement of the clutch on the shaft 12 which is controlled by the first air cylinder 18, and the next succeeding or second inlet valve will be opened and its exhaust closed, so that the second air cylinder 18 becomes operative to effect the clutching engagement of the second clutch on the shaft 12, and so on successively throughout the swing of the lever 38 toward the right, until the last valve operated by the lever 38 is opened by the said lever, when of course the engine is speeded up to its maximum. By a nicely adjusted movement of the lever 38 from one valve stem 28' to another, the engagement of one clutch on the shaft 12 will be effected at the moment when the one last used is disengaged or unclutched, so that there is a smooth progression in the speed change.

What I claim as my invention is;

1. In power transmitting mechanism, the combination of a rotatable power transmitting shaft, variable speed transmitting mechanisms loosely mounted on said shaft, clutch mechanisms rotatable with the shaft but slidable thereon, levers for effecting the engagement of the clutches with the respective variable speed transmitting mechanisms, cylinders arranged in suitable position with relation to the levers, and pistons connected to the levers and operated by an actuating medium admitted to and exhausted from the cylinders and adapted, when the piston of any cylinder is moved in one direction by the actuating medium, to cause the lever relating thereto to operate its clutch to effect a clutching engagement with its associated transmitting mechanism, and means, when the actuating medium is exhausted from a cylinder, to cause the lever and consequently the piston to return to normal position.

2. In a power controlling and transmitting mechanism, the combination of a power producing means, a pair of clutches connected directly to the said power producing means, a counter shaft, a plurality of clutches rotatable with the shaft but slidable thereon, connections between one of the clutches of the power producing means and the counter shaft, to cause the rotation of the power-producing means to be transmitted to the countershaft, a connection between the other of said clutches of the power producing means and the said counter shaft to cause the rotation of the power-producing means to be transmitted through that connection to the countershaft, whereby the engagement of one clutch causes the rotation of the counter shaft in one direction, and the engagement of the other of said clutches of the power producing means causes the rotation of the counter shaft in the opposite direction, cylinders adapted for the admission and exhaust therefrom of an actuating medium, pistons within the cylinder adapted to be moved in one direction upon the admission of the actuating medium to the cylinders, a connection between the piston of each cylinder and its associated clutch, whereby the clutch is moved to a clutching position when the piston is operated by the actuating medium, means for causing the piston to move in the opposite direction, when the actuating medium is exhausted therefrom, whereby the clutch is moved to unclutching position, and variable speed transmitting mechanisms mounted on the counter shaft and adapted to be respectively engaged by the clutches, when the said clutches are moved to clutching position by the pistons.

3. In mechanism of the class described, the combination with power producing mechanism, of power transmitting devices connected thereto, and adapted, respectively, when made operative, for causing the power-producing mechanism to transmit rotation in opposite directions, a cylinder attached to both of the power transmitting devices, and means for admitting the actuating medium to and exhausting the same from the said cylinder, whereby either of the transmitting devices are made operative through the action of said cylinder.

4. In mechanism of the class described, the combination with a series of power and speed varying devices of different ratios, of cylinders having the pistons thereof connected to said power and speed varying devices for causing the operation of each or any of said devices, and an actuating medium controlling device for admitting the actuating medium to a single cylinder at a time, and allowing the escape of the actuating medium from the other cylinders.

5. In a fluid controlling device, the combination with a series of power and speed varying devices of different ratios, cylinders having the pistons thereof connected to said power and speed varying devices for the purpose of making said devices operative or non-operative, an actuating medium controlling device, consisting of a lever adapted to be moved a limited distance around a stationary axis, and a series of actuating medium valves arranged to be opened by the movement of the lever, for admitting the actuating medium to the said cylinders, and actuating medium discharge valves also arranged to be operated upon by the said lever, whereby one admission valve is opened and its associated discharge valve is closed.

6. In a speed and power controlling mechanism, the combination of a power producing means, power and speed varying devices of different ratios, a controlling lever, valves for controlling a medium for actuating the power and speed varying devices, said valves arranged with their stems in the path of travel of said lever, whereby a movement of the lever causes the opening and closing of said valves, the opening of a valve causing the actuating medium to operate upon one of the power and speed varying devices and render said device operative, and another lever for operating valves for controlling the actuating medium which operates to cause the power producing means to rotate in either direction.

7. In power transmitting means, the combination of a rotatable driving shaft, a gear wheel mounted loosely on one end of said shaft, a sprocket wheel mounted loosely on the opposite end of said shaft, clutches rotatable with and slidable on the shaft, and adapted to be engaged with and disengaged from the gear wheel and sprocket wheel, respectively, means for simultaneously operating said clutches in such manner that when one clutch is engaged with its gear wheel or its sprocket wheel, the other clutch is disengaged from its gear wheel or sprocket wheel, as the case may be, a counter shaft, a gear wheel fast on said countershaft and meshing with the gear wheel of the driving shaft, a sprocket wheel fast on the countershaft, a chain connecting said sprocket wheel of the counter shaft to the sprocket wheel of the drive shaft, a plurality of gears normally loose on the counter shaft, the diameters thereof increasing progressively from one end of the shaft toward the other, means for causing any one of the gears to be clutched to or unclutched from the counter shaft so as to rotate said counter shaft or run loose thereon, a second counter shaft, and a series of gears mounted fast thereon, of suitable size to mesh with the gears on the first mentioned counter shaft, the said second counter shaft adapted to have different speeds transmitted thereto as the different gears on the first mentioned counter shaft are clutched to the said counter shaft.

8. In power transmitting means, the combination of a rotatable driving shaft, wheels mounted loosely on said shaft, clutches rotatable with and slidable on the driving shaft, and adapted to be engaged with and disengaged from the said wheels, levers, each pivoted at one end and engaging between its ends one of the clutches, a link or rod connecting the opposite ends of the levers, a cylinder having a piston therein and a piston rod extending outwardly through one end thereof and connected to one of the levers, means for introducing the piston actuating medium into the opposite ends of the cylinder, a counter shaft, means mounted thereon for receiving rotation from the wheels of the driving shaft and imparting said rotation to the counter shaft, a plurality of gears normally loose on the counter shaft, the diameters thereof increasing progressively from one end of the shaft toward the other, and means for causing any one of the gears to be clutched to or unclutched from the counter shaft so as to rotate said counter shaft, or run loose thereon, a second counter shaft, and a series of gears mounted fast thereon, said gears being of suitable size to mesh with the gears of the first mentioned counter shaft, the said second counter shaft adapted to have different speeds transmitted thereto as the different gears on the first mentioned counter shaft are clutched to the said counter shaft.

9. In power transmitting and controlling mechanism, the combination of a rotatable shaft, a plurality of gears normally loose thereon, the diameters of said gears increasing progressively from one end of the shaft toward the opposite end thereof, levers for causing any one of the gears to be clutched to or unclutched from the shaft so as to rotate said shaft, or run loose thereon, a counter shaft, a series of gears mounted fast thereon, said gears being of suitable size to mesh with the gears of the first mentioned shaft, the said counter shaft adapted to have different speeds transmitted thereto, as the different gears on the first mentioned shaft are clutched to said shaft, and means for operating, by compressed air, or other fluid, the clutch operating levers on the first mentioned shaft so as to cause the clutches to respectively engage with and disengage from the particular gear wheels with which they are associated.

10. In power transmitting and controlling mechanism, the combination of a rotatable shaft, a plurality of gears normally loose thereon, the diameters of said gears increasing progressively from one end of the shaft toward the opposite end thereof, levers for causing any one of the gears to be clutched to or unclutched from the shaft so as to rotate said shaft or run loose thereon, a counter shaft, a series of gears mounted fast thereon, said gears being of suitable size to mesh with the gears of the first mentioned shaft, the said counter shaft adapted to have different speed transmitted thereto as the different gears on the first mentioned shaft are clutched to said shaft, means for operating, by compressed air or other fluid, the clutch operating levers on the first mentioned shaft, so as to cause the clutches to respectively engage with or disengage from the particular gear wheels with which they are associated, and a lever for operating said compressed air or fluid actuating means.

11. In power transmitting and controlling mechanism, the combination of a rotatable shaft, a plurality of gears normally loose thereon, the diameters of said gears progressively increasing from one end of the shaft toward the opposite end thereof, clutches mounted on said shaft and adjacent to the gears, and adapted to be operated so as to effect a clutching engagement with or disengagement from the respective gears, so as to cause the gears to rotate said shaft or run loose on the shaft, a counter shaft, a series of gears mounted fast thereon, said gears being of suitable size to mesh with the gears of the first mentioned shaft, the said counter shaft adapted to have different speeds transmitted thereto, as the different gears of the first mentioned shaft are clutched to said shaft, a lever connected to each clutch, a series of cylinders having pistons therein and piston stems projecting from the ends of the cylinders and connected to the respective levers, a controller box having a chamber formed therein adapted to receive an actuating medium, and said box provided with a series of separate passages, each passage opening at one end into the chamber and at its opposite end communicating with an exhaust opening, an admission valve for controlling each opening leading from a passage to the chamber, an exhaust valve for controlling each exhaust opening, a pivoted lever adapted to be swung over the inlet and exhaust valves, and constructed when over the inlet and exhaust valves relating to any particular passage to open the inlet valve and close the outlet valve relating to that particular passage, the other inlet valves remaining closed and the exhaust valves open, a pipe leading from each passage to one end of each of the cylinders, and adapted to permit the actuating medium to flow to the cylinder and actuate the piston therein, when the exhaust valve of the particular passage is closed and the inlet valve thereof opened, and to effect the operation of the clutch operating lever to cause a movement of the clutch, and means, after the actuating medium ceases to act on the piston of any particular cylinder, for returning the clutch operating lever relating thereto and consequently the piston, to normal position.

12. In power transmitting and controlling mechanism, the combination of a rotatable shaft, a plurality of gears normally loose thereon, the diameters of said gears increasing progressively from one end of the shaft toward the opposite end thereof, clutches mounted on said shaft adjacent to the gears and adapted to be operated so as to effect a clutching engagement with or a disengagement from the respective gears so as to cause the gears to rotate the shaft or run loose on said shaft, a counter shaft, a series of gears mounted fast thereon, said gears being of suitable size to mesh with the gears of the first mentioned shaft, the said counter shaft adapted to have different speeds transmitted thereto as the different gears of the first mentioned shaft are clutched to said shaft, a lever fitted to each clutch, a series of cylinders having pistons therein and piston stems projecting from the pistons and extending through the ends of the cylinders and connected to the respective levers, a controller box having a chamber formed therein adapted to receive an actuating medium, and said box provided with a series of separate passages, each passage opening at one end into the chamber and at its opposite end communicating with an exhaust opening, an admission valve for controlling each opening leading from a passage to the chamber, and normally closed by spring pressure, and provided with a projecting stem extending above the controller box, an exhaust valve for controlling each exhaust opening and normally closed by spring pressure, and provided with a projecting stem extending above the controller box, a lever medially fulcrumed above the controller box and having its end edge over the stems of the exhaust valves widened or enlarged, said widened or enlarged portion being provided centrally at its outer edge with a cut away portion, and said lever adapted to be swung over the stems of the inlet and exhaust valves, and when over the stems of the inlet and exhaust valves of a particular passage to act on the stem of the inlet valve so as to open said stem of the inlet valve, and permit the valve stem of the exvalve of said passage to enter the cut away portion of the enlarged or widened end of the lever, and thereby permit said exhaust valve to close, a pipe leading from each passage to one end of each of the cylinders, and adapted to permit the actuating medium to flow to the cylinder and operate the piston therein, when the exhaust valve of a particular passage is closed and the inlet valve thereof opened, in order to effect a movement of the clutch operating lever in a direction to cause a clutching engagement of its clutch with the associated gear wheel, and means, after the actuating medium ceases to act on the piston of any particular cylinder, for returning the operating lever relating thereto and consequently the piston to normal position.

13. In power transmitting and controlling mechanism, the combination of a rotatable driving shaft, means normally loose on said shaft for transferring the power of the driving shaft, clutches on the driving shaft adapted to engage with or disengage from the respective power transferring mechanisms, levers for throwing either one of the clutches into clutching engagement with its associated power transferring mechanism, and the other clutch out of clutching engagement with its associated power transferring mechanism, a link or rod connecting the said levers, a double acting cylinder having a piston therein provided with a projecting piston stem extending through one end of the cylinder and connected to one of the levers, a counter shaft a plurality of gears normally loose thereon, the diameters of said gears progressively increasing from one end of the shaft toward the opposite end thereof, clutches mounted on said counter shaft adjacent to the gears and adapted to be operated so as to effect a clutching engagement with or disengagement from the respective gears to rotate the counter shaft or run loose thereon, a second counter shaft a series of gears mounted fast thereon, said gears being of suitable size to mesh with the gears of the first mentioned counter shaft, the said second counter shaft adapted to have different speeds transmitted thereto as the different gears of the first mentioned shaft are clutched to said shaft, a lever connected to each clutch, a series of cylinders having pistons therein, piston stems projecting from the pistons and extending through the ends of the cylinders and connected to the respective levers, a controller box having a chamber formed therein adapted to receive an actuating medium, and said box provided with a series of separate passages, each passage opening at one end into the chamber, and having its opposite end communicating with an exhaust opening, an admission valve for controlling each opening leading from a passage of the chamber, an exhaust valve for controlling each exhaust opening, a pivoted lever adapted to be swung over the admission and exhaust valves, and constructed when over the inlet and exhaust valves relating to any particular passage to open the inlet valve and close the outlet valve relating to said particular passage, the other inlet valves remaining closed and the exhaust valves open, a pipe leading from each passage to one end of each cylinder of the series, and adapted to permit the actuating medium to flow to one of said cylinders, and actuate the piston therein, when the exhaust valve of the particular passage is closed and the admission valve thereof is opened, in order to cause the clutch operating lever to move in a direction to effect a clutching engagement of the clutch, means, after the actuating medium ceases to act on the piston of any particular cylinder of the series, for returning the clutch operating lever relating thereto and consequently the piston to normal position, pipes leading from opposite ends of the double acting cylinder and extending to another chamber in the controller box, said chamber provided with admission and exhaust openings, valves controlling the said openings and adapted to control the flow of an actuating medium from the said chamber alternately to opposite ends of the said double acting cylinder, and a lever operating on the valve in such manner that when the inlet valve of one pipe is in open position its exhaust valve is closed, and the inlet valve of the other pipe is closed and its exhaust opened.

LOUIS J. MONAHAN.

In presence of—
W. W. WATERHOUSE,
WM. B. STICKNEY.